United States Patent [19]

Kuchta

[11] Patent Number: 5,491,121
[45] Date of Patent: Feb. 13, 1996

[54] ENVIRONMENTALLY FRIENDLY COLOR-CODED FORMS AND METHOD FOR CREATING SAME

[76] Inventor: Ron Kuchta, 1219 Elizabeth, Naperville, Ill. 60540

[21] Appl. No.: 154,287

[22] Filed: Nov. 17, 1993

[51] Int. Cl.$^6$ ..................................................... B41M 5/00
[52] U.S. Cl. .................................. 503/200; 162/4; 281/2; 428/194; 428/195; 428/207; 428/211; 428/537.5; 503/205; 503/226
[58] Field of Search ............................. 162/4–8; 281/2; 428/195, 207, 211, 537.5, 192, 194; 503/205, 226, 200

[56] References Cited

U.S. PATENT DOCUMENTS 5,275,846   1/1994   Imai et al. .............................. 427/362

OTHER PUBLICATIONS

William E. Franklin, "Paper Recycling, The Art of the Possible 1970–1985, Summary and Overview" Published Mar., 1973.

Jon C. Cyer and Nicholas A. Mignone, "Handbook Of Industrial Residues, vol. 1: Industries and Management Options; vol. 2: Treatment Technology", Published 1983.

Jeffrey S. Arpan, Alan D. Bauerschmidt, J. Carl Clamp, Gregory Dess, Kate Gillespie, Daniel Sullivan, J. Frederick Truitt, Eero Artto, "The United States Pulp And Paper Industry: Global Challenges And Strategies", Published 1986.

Primary Examiner—B. Hamilton Hess
Attorney, Agent, or Firm—James T. FitzGibbon

[57] ABSTRACT

An array of color-coded papers that can be collected and recycled with white paper without separation. The sheets are individually color-coded with a printing ink including an oil-based vehicle component and a dye-free pigment component that is dispersible in a surfactant-water mix used to recycle the paper. Preferably, the color code is on a marginal area, with the image area comprising the remainder of the sheets. The invention also relates to multi-part business form sets using an array of such sheets, arranged so that each sheet is distinguishable from another sheet in the form set by the color code.

12 Claims, 2 Drawing Sheets

ENVIRONMENTALLY FRIENDLY COLOR-CODED FORMS AND METHOD FOR CREATING SAME

BACKGROUND OF THE INVENTION

In the past two decades, environmental concerns and economics have encouraged, if not required, a return to significant and widespread reliance on paper recycling. It is estimated that, in 1950, over 30% of the fibers used in the paper and paperboard industry were derived from waste paper. By 1970, recycled, i.e., waste, paper accounted for only some 22–23% of the fibers used to create new paper and paperboard products, even as the volume of paper produced was rising dramatically.

There were any number of reasons for this large decline in the use of recovered paper, including post-World War II increases in the forest resources available to the paper industry, and serious practical problems faced in collecting, separating, and processing post-consumer waste paper. Because paper recycling declined after World War II even while demand for paper steadily increased, paper products have represented a major burden for solid waste management efforts. Although paper is "biodegradable" in the sense that it will break down under proper conditions given sufficient time, the very nature of modern landfills, wherein wastes are isolated from water and microbes necessary to stimulate biological and chemical breakdown, degradation of waste paper into carbon dioxide and water is unlikely to happen in meaningful amounts, again given the state of many current practices.

As has been increasingly recognized over the past two decades this means that unless the waste stream can be used as a source for paper products made from such waste, society will be threatened with burial in its own discarded, but in many cases perfectly reusable, post-consumer waste paper. For these reasons, interest in paper recycling has revived, as is evidenced by the many consumer paper products on the market bearing a logo identifying recycled paper products or otherwise indicating their manufacture, at least in part, from recycled materials. The challenge remains to convert, to the maximum extent practicable, an environmental problem into an environmentally friendly economic resource.

One of the most persistent problems plaguing paper recycling efforts is separation. Certain paper products are far more easy and inexpensive to process than others. For this reason, waste paper haulers may pay a premium for certain kinds of waste paper, such as recyclable white paper, but may refuse to pay for paper colored with permanent dyes, or even charge for hauling it away.

Attempting to sort the hundreds of tons of mixed paper refuse produced by even a moderate sized community is extremely labor intensive, and is thus economically prohibitive. Yet where, for example, the only difference between a high quality, desirable piece of waste paper and one considered unusable, "contaminated," or fit only for a less profitable use, is that the former is free of permanent dye whereas the latter is dyed, it can be appreciated that hand separation has heretofore been believed to be the only way available for sorting.

Although, at least theoretically, sorting waste paper into its constituent sub-categories could be accomplished at each location where waste paper is generated, the practical difficulties presented by such an approach are virtually insurmountable. Large institutions especially would be saddled with prohibitively expensive, onerous burdens if compelled to educate workers about, and then oversee, internal separation and disposal schemes. Moreover, even in the case of a highly motivated work force generally committed to the recycling program, the ongoing, consistent depositing of different categories of paper into specially designated receptacles situated about the work place would be at best a time consuming and thus impractical process.

Yet large and small institutions alike generate a tremendous amount of waste paper of different recycling qualities. The use of a multiplicity of more or less standardized paper forms in day to day operation is extremely common. Frequently, such forms are required to be filled out in duplicate to be routed and dispersed among persons or files both inside and outside the entity originating them. Of course, the most common method used for differentiating the various paper sheets comprising such forms is by color coding. Triplicate forms comprising white, yellow, and pink paper sheets, for example, are widely used.

Even where duplication of a particular form at the time it is generated is not necessary, institutions rely heavily on various standard forms, such as requisition forms, inventory sheets, medication schedules, etc. Color coding in such instances is used so that the proper form for a particular use or destination can be quickly and accurately selected out of an aggregation of forms, either from general office storage or from supplies maintained at the work station.

Other color coding exists where letter or other documents are prepared, whether by typing, printing or otherwise, in multiple copies, each of a different color. Where the sheets are colored by dye, it is not practical to recycle them. On the other hand, sheets made from white paper are recyclable, even if heavily written on, typed on, or printed.

Up to now, the clearly efficacious method of color coding business and other forms has been accomplished through the use of permanent dyes that impregnate the very fibers of the paper itself. Unfortunately, once dyed in this manner, the paper is degraded from the recycler's point of view, and cannot be processed economically into re-usable white paper by mixing with white waste paper and subsequently de-inking, pulping, bleaching and reconstituting such paper on a papermaking machine.

In view of these problems, it is the object of the present invention to provide businesses, hospitals, schools, and other institutions requiring specialized forms, which are often filled out in duplicate and dispersed to multiple recipients, with color-coding systems rendering the sheets readily distinguishable and distributable by color, and yet capable of being recycled with white paper without further separation.

Another object of the invention is to provide color-coded papers capable of being recycled as white paper, using conventional and inexpensive printing technology, wherein such sheets of paper are easily distinguished by color code from sheets of paper similarly coded with other colors, and wherein such sheets of paper are readily aggregated with other papers of the same color code, or with papers coded with different colors, for use as specialized forms requiring categorization by subject, recipient, or otherwise.

Another object of the invention is to provide color-coded sheets of paper wherein the color coding is imparted through the application to individual sheets of surface adhering ink amendable to standard de-inking methods used in processing waste paper for recycling.

A further object of the invention is to provide paper having color code areas such as the margins or other areas made by printing with non-dye type inks permitting easy recycling, as well as having substantially color-free image or message-receiving areas. The color-coded area, which may but need not comprise the entire face of the sheet, may be made by various known techniques, including half-tone or other screen printing, using pre-diluted inks creating a tinted appearance, or the like.

A still further object of the invention is to provide recyclable, color-coded paper at low cost.

The foregoing and other objects and advantages of the invention are achieved in practice by providing a paper product, usually in the form of an array of color-coded papers capable of being individually color-coded by using a non-dying ink able to be removed from the paper fibers by conventional de-inking processes, whereby the individually color-coded sheets may be recycled as white paper, whether mixed with non-color-coded paper or otherwise.

The exact manner in which the foregoing and other objects and advantages of the invention are carried into practice will become more clearly apparent when reference is made to the following detailed description of the preferred embodiments of the invention set forth by way of example, and shown in the accompanying drawings, wherein like reference numbers indicate corresponding parts throughout.

BRIEF DESCRIPTION OF THE DRAWINGS

FIG. 2 is a perspective view of a sheet of paper similar to that of FIG. 1, and showing the same after a message has been imparted thereto as by typing, writing, printing, or the like;

DESCRIPTION OF THE PREFERRED EMBODIMENTS OF THE INVENTION

While the present invention may be embodied in different forms, a description of various embodiments will be given wherein the intended use of the product is in a business office, a hospital or the like where correspondence, business forms, or the like are commonly utilized. The color coding is placed on the sheets by printing, preferably before the sheets are collated and/or assembled, with a preferably soybean oil-based or similar type ink being used to impart the color code.

The principle of color coding key portions only of individual sheets of paper and distinguishing them from otherwise similar sheets by a color coding feature is easily applied in a multi-part form application, wherein the product is a snap-out or pull-out type array of sheets. The principle may also be used in an application wherein stacks of plural individual sheets, each having its own characteristic color, are arranged in groups before being collated into multi-part form. Such forms may be so-called pin-feed (i.e., continuous) forms or other known types of multi-sheet forms.

According to the invention, the color coding feature is imparted by printing on non-colored or white sheets, a suitable ink as referred to herein, whereby subsequent recycling of the paper as white paper is possible, whether or not the color-coded paper is actually mixed with white or uncolored paper. This is also true regardless of the degree, if any, to which the paper has been previously recycled.

Figure 1:
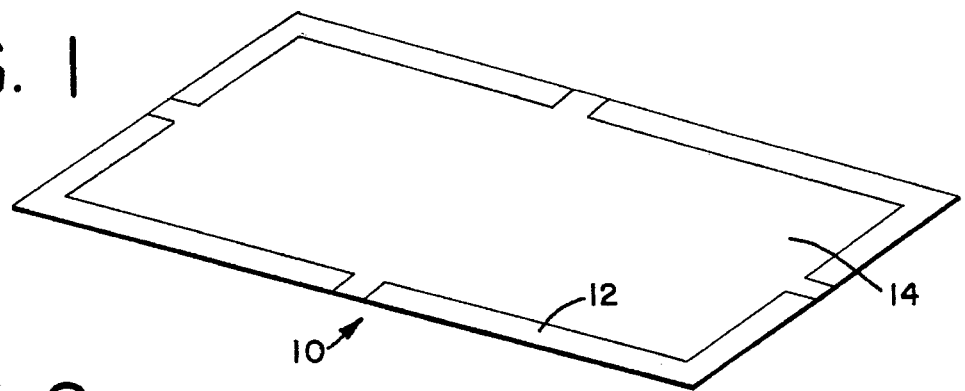
FIG. 1 is a perspective view of a sheet of paper made according to the invention and embodying color-coded outer margin areas and an inner color code-free image area or the like adapted to receive or contain information.
Figure 4:
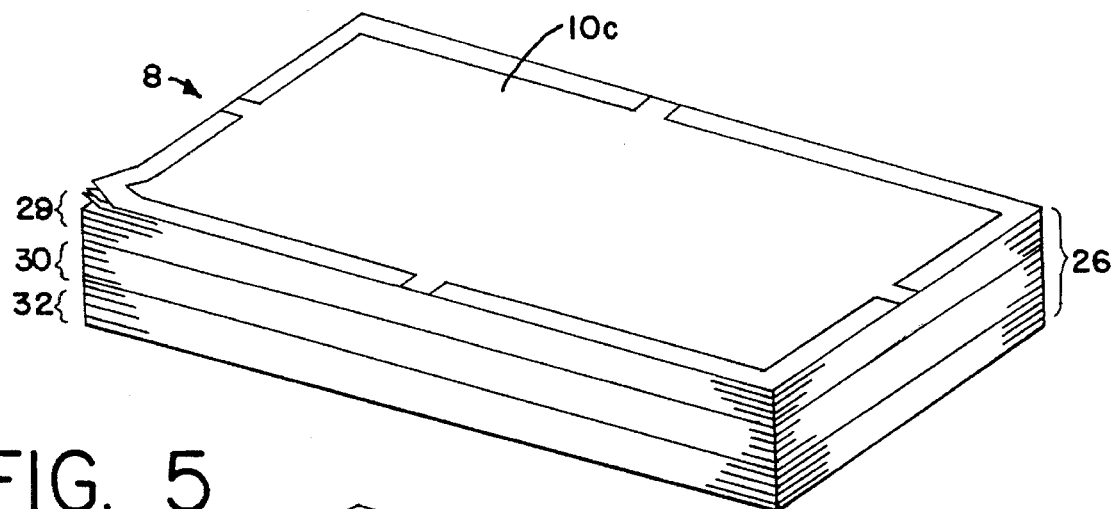
FIG. 4 is a perspective view of an array of individual sheets of the type shown in FIG. 1, 2, or 3, with the array being made from plural groups of individual sheets, with each group having a characteristic color coding different from that of the other groups within such array as a whole.

Referring now to FIGS. 1 and 4, the invention is shown typically to be embodied in a stack or like array 8 of plural, individual sheets of paper, one sheet of which generally designated 10, is shown in FIG. 1. Here, the sheet 10 includes an outer marginal area generally designated 12, and a center or image area generally designated 14. By "image area" is meant an area wherein an image is normally intended to be imparted by the user, with the expression "image" being intended to cover print messages, handwriting, illustrations, outlines of forms, or otherwise. In this respect, it is distinguished from what is termed the color-coded area, usually a "margin" or "marginal" area generally designated 12 and lying for purposes of convenience near the edge of the sheet.

Figure 2:
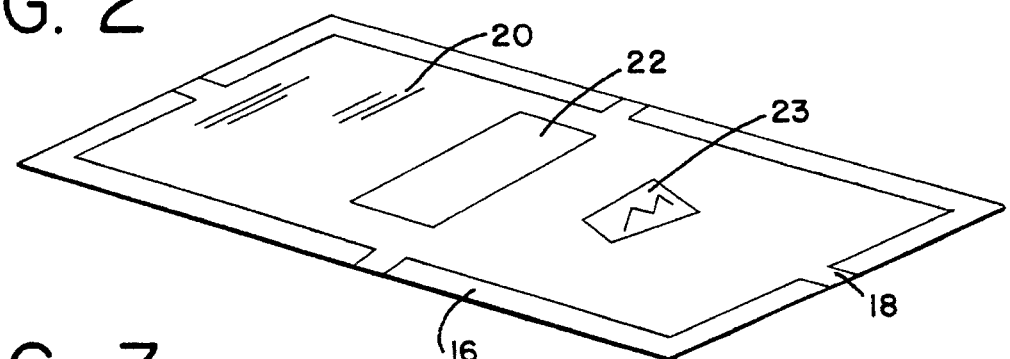

As shown in FIG. 2, the margin may be colored either completely or to any lesser extent desired, but may be subdivided into a marginal area 16 bearing a color code and a color-free margin area 18. In the preferred form of the invention, this margin is wide enough to be clearly visible, but narrow enough to permit substantially unrestricted use of virtually all of either or both remaining surfaces of the paper sheet 10 as image areas. Preferably, the color margin may be from ⅛" to ½" in width. The margin may be continuous or may be continuously colored in spaced apart areas or blocks. Side, top, and bottom margins may, but need not, have color code margins of equal width.

According to the invention, plural sheets of paper, such as the blank sheets of paper 10 shown in FIG. 1, are intended to receive a message, as by typing, writing, or printing. Then, such blank sheets of paper (FIG. 1) are converted to sheets such as those shown in FIG. 2. FIG. 2 shows there are individual lines 20 of intelligible information, arrayed in one or more paragraphs 22. Pictorial or graphic illustrations 23 as shown, may also appear. These sheets are color-coded in the margin 12 to control distribution (FIGS. 1, 2). The color coding is placed in the margin by a printer, who uses an ink with a soybean-oil based vehicle, or other suitable ink. The same printer or another printer or machine may be used to input the other information 20, 22, 23 forming parts of the pre-printed sheet or form 10.

Figure 3:
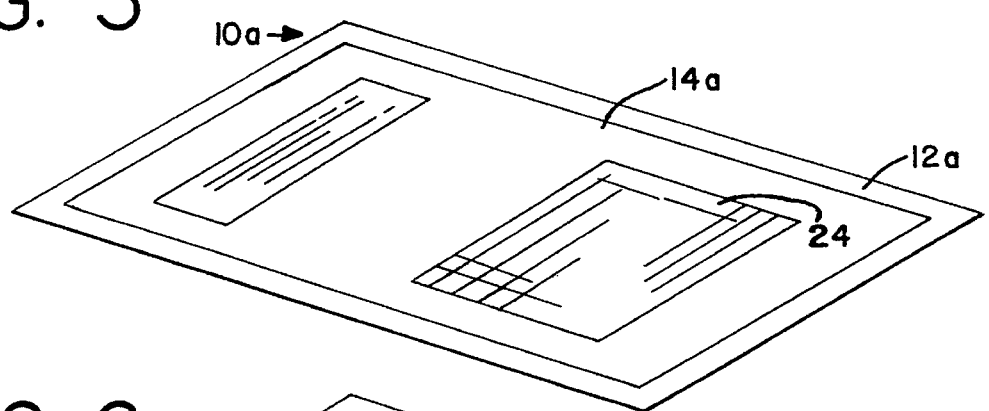
FIG. 3 is a perspective view similar to that of FIGS. 1 and 2, except that a grid or other predetermined pattern of information is printed thereon such that the sheet may be used as a business form or the like for recording information in a predetermined format.

FIG. 3 shows a sheet 10a similar to that of FIGS. 1 and 2, but differing in two respects. In the sheet 10a, the margin areas generally designated 12a are shown to be in the form of a continuous band of color along the top, side, and bottom margins of the sheet. Moreover, the image area 14a is shown as including plural, pre-printed boxes, lines, or the like 24, which typically contain additional information and may include, for example, legends adjacent the boxes or the columns.

Referring now to FIG. 4, a stack generally designated 26 of individual paper sheets 10*c* is shown, with the stack 26 comprising within it plural individual groups 28, 30, 32 of individual sheets such as the individual sheets 10*c* in FIG. 4. In FIG. 4, one group 28 of sheets is shown by the shading to comprise a number (typically 50–100) of individual sheets 10*c* each having, for example, a pink colored-coded outer margin. Beneath this group 28 is a second group of sheets 30 in which the individual sheets are made from a characteristic but different marginal color, such as blue. These sheets are otherwise identical to their counterparts in the group 28. The numeral 32 shows a third array of sheets, all of which have a margin coded with a color different from the color on the margins of the sheets contained respectively in the groups 28, 30.

The stack 26 of all such sheets may be delivered to a user who can then separate the sheets by color, so as to create one stack of sheets with a pink margin, a stack with a blue margin, and a stack with a yellow margin, for example. These sheets may then be collated into color-coded sets. Circulation of the document thus prepared is achieved by sending a color-coded copy to each destination, such as a white original to a customer, a pink to the originator's file, a yellow to the accounting department, and a blue to the sales department.

According to the invention, the various color-coded sheets of paper, whether in the form of correspondence, records, forms, or otherwise, may be simply discarded into ordinary waste paper baskets for subsequent collection. According to current practices, as long as such waste paper baskets are free from permanently dyed paper, the entire paper contents may be recycled as white paper.

Consequently, although the sheets in question are color-coded, they may be simply discarded as white paper as far as recycling potential is concerned. It is not necessary to separate white paper in the waste stream from paper which has been color-coded according to the invention. This is because, as pointed out above, the color code portion consists of an area imprinted with soybean ink or the like, which uses known, ordinary pigments rather than dyes and such pigments are carried in a water-dispersable vehicle. Accordingly, these color-coded sheets are compatible with the conventional steps taken to recycle ordinary, non-dyed paper.

Such recycling processes are not per sea part of the present invention. They are well known to those skilled in the art. By way of background, however, such processes usually consist basically of placing the paper to be recycled into water with a surface active agent/detergent, and beating the water/paper/surfactant-detergent mix into a slurry or fine fibre pulp. The detergent/surface active material separates the pigment and the oil-based vehicle from the fibers, which are then washed, gravity-separated, rinsed, re-bleached, if necessary, and fed to a paper making machine such as a Fourdrinier machine or a cylinder type machine.

Prior to the present invention, papers have been color-coded in a conventional way, namely by impregnating the fibers with a dye which resisted separation using the techniques used to de-ink newsprint or recycle other ink-coated papers. Hence, in the past, the advantage of color coding to determine routing, circulation, etc. of business forms and correspondence could only have been achieved by compromising the ability of the papers to be recycled. With the invention, both advantages, color coding and recyclability, remain available.

Figure 5:
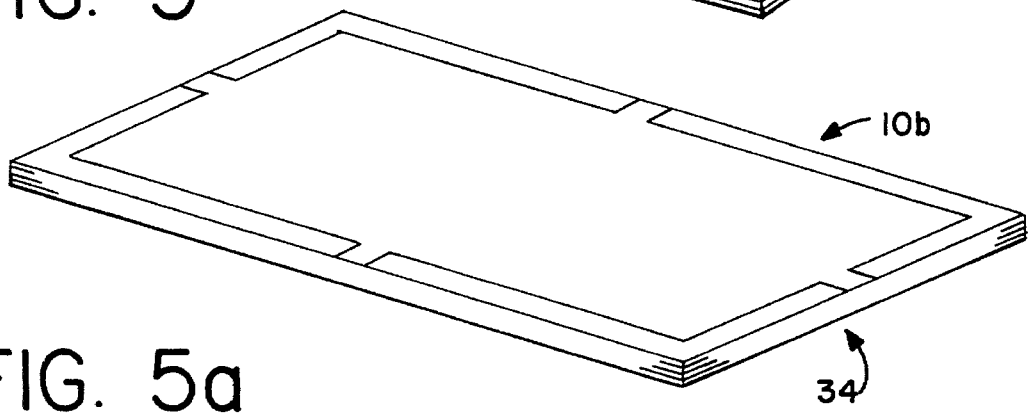
FIG. 5 is a perspective view of a multi-part form wherein each of the individual sheets making up the form contains the same or similar outline for recording information but in which each sheet embodies a color-coded margin of a different color.
Figure 5A:
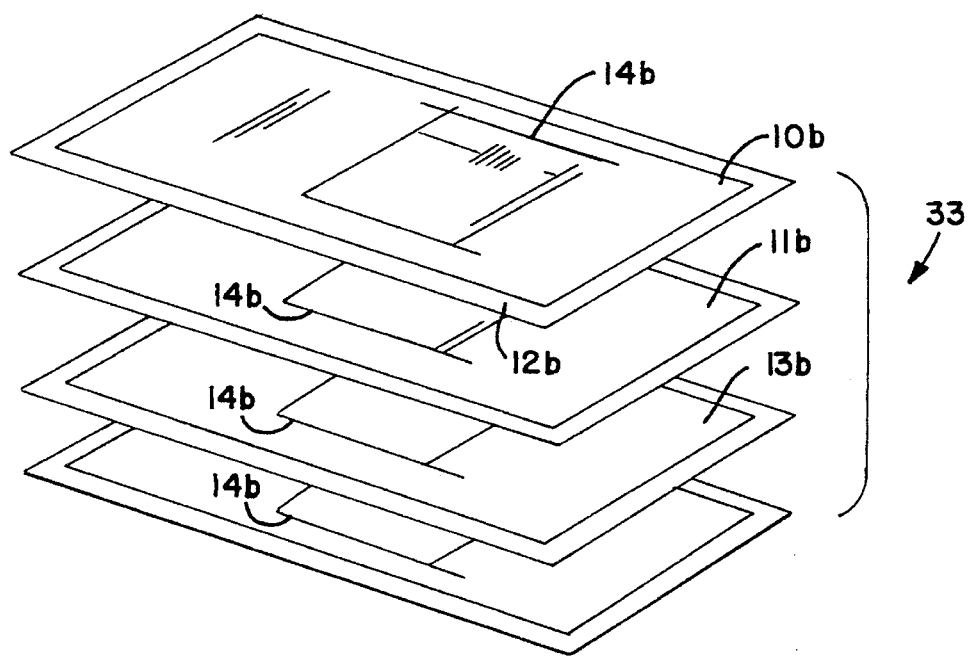
FIG. 5a is an exploded view of the multi-part of FIG. 5.

Referring again to the drawings, FIG. 5 shows another embodiment of the invention. Here, an individual, multi-part preprinted form 34 is shown, and FIG. 5*a* shows an array 33 of such sheets. The individual sheets, generally designated 10*b*, include printed areas 14*b*, or the like, as well as margins 12*b*, which contain the characteristic coded color. In manufacturing such a multi-part form, it is preferred that a large run of the first sheet of the form be made, for example, on white paper, a correspondingly large run be made of another sheet of the same form, using white paper which is overprinted with a first characteristic code color in the margin. The same procedure is followed for each subsequent group of paper sheets. Thereafter, the individual color-coded papers are collated into a group making up a form 34, as shown in FIG. 5, with such an array thus comprising a top sheet 10*b* without a color-coded margin and three color-coded sheets 11*b*, 13*b*, etc. lying below the top sheet 10*b*. Naturally, any number of sheets may be used.

The form 34 as a whole may be assembled into a form group by fastening with adhesives, staples, or the like in a known manner. After use, at the place of business, the individual sheets 11*b*, 13*b*, etc. of such multi-part forms, may simply be discarded in a single waste paper collection station for recycling as white paper. This has a considerable economic advantage, as pointed out above.

The inventive concept is compatible with the use of replacements for carbon paper in copy sets. For example, so-called "NCR" (carbonless duplicating) paper that creates its own duplicate copies, is recyclable as white paper. Such paper is available from numerous sources. Color-coded copy sets can be used by marking such paper in the color-coded portion of the form.

Figure 6:
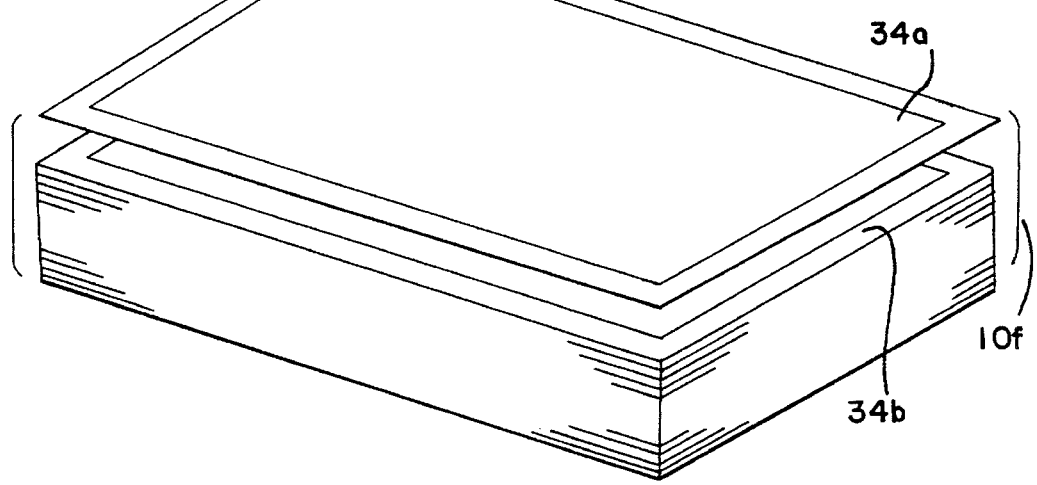
FIG. 6 is a perspective view of an array of multi-part forms such as those shown in FIG. 5, and showing one form separated from the top of a stack of similar forms.

Referring now to FIG. 6, there is shown an array generally designated 10*f* of individual forms 34*a*, 34*b*, etc. Each form has individually interleaved color sheets as described above. While FIG. 6 shows plural, multi-sheet forms, it is understood that a stack of individual, color-varied sheets without printing might also be assembled and used in the same way. In this case, each successive sheet within a group is coded with a different color than the preceding sheet with such repetition occurring in a controlled pattern to form a color-coded group. Such sheets may be advantageously utilized when an individual original is prepared, as by typing or the like, and plural copies are to be made by a duplicating machine. Here, placing the color-coded copies in a duplicator set for four each of a sheet, for example, and fed by a stack such as that in FIG. 6, will then reproduce a multi-sheet document in a way such that plural, collated groups, each having a characteristic color code will be produced.

According to the invention, the user may purchase sheets that are printed and arranged in any of the ways described. It is believed attractive for printers who are manufacturing multi-part forms to impart the marginal color code using the soybean-oil-based ink. Such printing is accommodated by the equipment customarily used by small printers. It will be appreciated that imparting the color margin may also conceivably be performed at a different time or by a different operator than imparting the legends or other print work appearing on the forms.

In several of the foregoing examples, reference has been made to the use of soybean-oil based ink. In this connection, other inks may also be used satisfactorily, including those such as inks from the "PMS" system, otherwise sometimes known as the "Pantone® Matching System". These inks are available from the Handschy Ink and Chemicals Division. Such inks provide a wide range of color tints.

Other methods of obtaining different shades, tints, or densities of color impression are also available. For example, the ink may be placed on the color code areas using a half-tone or other screen; may be placed on the sheet using other pattern coding methods, or otherwise in any manner known to those skilled in the art and calculated to impart a visible color to the area. The tint, hue, and color density of the particular color-coded area is not important to the practice of the invention.

As pointed out, the invention is advantageously used in cases where there is preprinted information on forms or the like, as well as circumstances wherein there is no such preprinting, but wherein the information is prepared completely on the job site. Other color-coded applications are also possible, such as color coding so-called "Post-It" (T.M. 3M Corp.) marking tabs.

According to the invention, assuming that an average form contains four sheets, and that the array of waste paper used in an operation is comprised of such sheets, the recyclability of such paper forms will go from zero in the case of multi-part prior art forms or commingled forms to 100% in the instant case. In addition, utilizing papers made according to the present invention can prevent unintentional contamination of a white paper stream. When it is considered that using dyed paper not only impedes recycling by economical methods, but actually creates the risk of preventing recycling of otherwise recyclable paper by contaminating the waste stream, the advantages of the invention can be better appreciated.

It will thus be seen that the present invention provides a system for improving the recyclability of papers, for creating multi-part forms, for creating paper capable of being used in color coding operations and having other advantages and characteristics, including those referred to specifically herein and others which are inherent in the invention. Various preferred embodiments having been described in detail, by way of example, it is anticipated that variations in the described forms of products and methods may occur to those skilled in the art, and that such variations may be made without departing from the spirit of the invention or the scope of the appended claims.

I claim:

1. An array of color-coded papers capable of being collected with white paper and recycled without further separation after use, said array comprising, in combination, plural individual groups of paper sheets, with each individual group comprising plural individual sheets of paper, and with each sheet in a given group being color coded such that each group is distinguishable by color from other groups in said array, and is able to be divided or classified in use by said visible color code feature, and wherein said color code of each sheet appears on at least one face of each of said sheets, in a color code area of said sheet face, said color being applied thereto using a printing ink comprising an oil-based vehicle component and a dye-free pigment component, at least said pigment component being dispersible in a water-surfactant mix used in recycling and separable from the paper fibers created by said recycling, whereby said color-coded sheets can be recycled with white paper without imparting the color from the printing ink pigment to the recycled paper.

2. An array of color-coded papers as defined in claim 1 wherein said color-code feature comprises a color code area occupying a small proportion of the overall surface area of said sheet.

3. An array of color-coded papers as defined in claim 1 wherein said visible color code feature on each of said individual sheets comprises a color coded margin extending substantially about the exterior of said sheet.

4. An array of color-coded papers as defined in claim 3 wherein said margin is a continuous margin.

5. An array of color-coded papers as defined in claim 3 wherein said surface-adhering substance is applied so as to cause the color to bleed onto the edge of each of said sheets, whereby the color code on said sheet is visible from the side of the sheet as well as the face of said sheet.

6. An array of color coded-papers as defined in claim 5 wherein at least some of said sheets include pressure responsive image transfer constituents adapted to produce an image on a subjacent copy when the original is subjected to writing pressure.

7. An array of color-coded papers as defined in claim 1 wherein said color code is impressed by screen printing.

8. An array of color-coded papers as defined in claim 1 wherein said code area comprises plural, spaced apart portions of the margin of each of said individual sheets.

9. An array of papers as defined in claim 1 wherein said array comprises plural, individual multi-part, color-coded business forms and, wherein the individual sheets within said array include format information enabling said sheets to be used alone or in combination with other sheets from said array for purposes of creating identically formatted information.

10. An array of color-coded papers as defined in claim 1 wherein at least some individual sheets are sheets capable of image-reproducing upon contact pressure from a writing instrument.

11. A multi-part form comprising individual sheets of paper, said sheets including front and back faces and edges defining the outer perimeter of said sheets, wherein each sheet included in said form is distinguishable from other sheets in said form by being color-coded, said color coding being accomplished through application of a colored printing ink comprising an oil-based vehicle component and a dye-free pigment component, at least said pigment component being dispersible in a water-surfactant mix used in recycling and separable from the paper fibers created by said recycling, thus enabling all sheets in said form to be capable of being recycled as white paper without imparting the color from the printing ink pigment to the recycled paper.

12. A business form comprised of a plurality of individual color-coded sheets each capable of being collected with white paper and recycled as white paper without further separation by reason of the materials used to impart color coding to said paper, said form comprising plural individual sheets of paper, each of said sheets including front and back faces, outer margins, and edges defining the outer perimeter of said sheets, and wherein at least portions of said outer margin areas of said sheet faces are impressed with a colored surface-adhering printing ink to form a color code area in said margin, said printing ink comprising an oil-based vehicle component and a dye-free pigment component, at least said pigment component being dispersible in a water-surfactant mix used in recycling and separable from the paper fibers created by said recycling, said printing ink thereby enabling a visible color code to be imparted to said papers and whereby said sheets may be recycled without imparting the color from the printing ink pigment to the recycled paper.

* * * * *